United States Patent [19]

Okuda et al.

[11] 4,417,119
[45] Nov. 22, 1983

[54] LIQUID JOINT PROCESS

[75] Inventors: Takio Okuda; Junichi Sakai, both of Amagasaki, Japan

[73] Assignee: Mitsubishi Denki Kabushiki Kaisha, Tokyo, Japan

[21] Appl. No.: 275,939

[22] Filed: Jun. 22, 1981

[51] Int. Cl.³ .......................... B23K 1/04; B23K 35/38
[52] U.S. Cl. ................................... 219/72; 219/85 CM
[58] Field of Search ................... 219/72, 85 R, 85 CA, 219/85 CM, 85 M

[56] References Cited

U.S. PATENT DOCUMENTS 1,658,713  2/1928  Fuller ........................................ 219/72
3,196,247  7/1965  Piercy et al. ............................. 219/72

FOREIGN PATENT DOCUMENTS 395663  7/1933  United Kingdom .................. 219/72

Primary Examiner—M. H. Paschall
Assistant Examiner—Alfred S. Keve
Attorney, Agent, or Firm—Oblon, Fisher, Spivak, McClelland & Maier

[57] ABSTRACT

A liquid joint process which includes the steps of feeding a liquid in a clearance formed between an electrical contact for joint and a carrier and around a joint part for joining the electrical contact and the carrier; a step of holding the electrical contact and the carrier by an upper electrode and a lower electrode from both sides under a predetermined pressure; and feeding current between the electrical contact and the carrier through the upper and lower electrode.

4 Claims, 9 Drawing Figures

FIG. 1 PRIOR ART
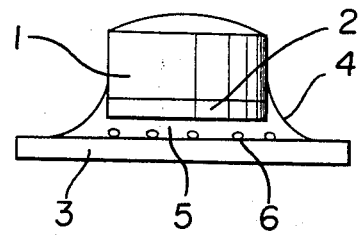
FIG.2 (A) PRIOR ART
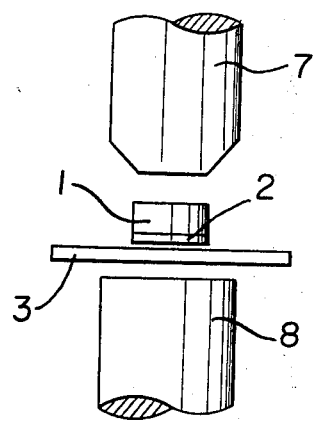
FIG.2 (B) PRIOR ART
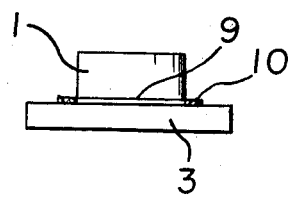
FIG. 5
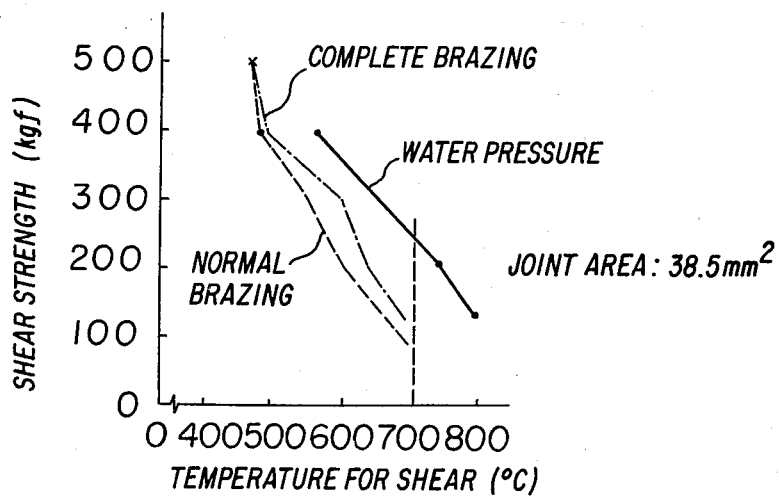

LIQUID JOINT PROCESS

BACKGROUND OF THE INVENTION

1. Field of the Invention

The present invention relates to a liquid joint process for joining of an electrical contact and a carrier.

2. Description of the Prior Art

An electrical contactor comprising a carrier made of a copper alloy and an electrical contact made of Ag-CdO material, or $Ag-SnO_2-In_2O_3$ material has been used in a magnet switch and a nofuse breaker etc.

Such an electrical contactor is illustrated in FIG. 1.

In the preparation of such electrical contactor which should have high disconnection resistance and high fusion resistance, a brazing process is employed for joining of an electrical contact (1) and a carrier (3) as shown in FIG. 1.

When a clad silver layer (2) is formed on the joint surface of the electrical contact (1) and then, a brazing material and flux are fed between the silver layer and a carrier (3) in a brazing work item, brazing is attained between the clad silver layer (2) and the carrier (3) to form a fillet (4) around the electrical contact (1) and the carrier (3). However many voids (6) are formed in the brazing part (5). It is considered that a joint area coefficient between the contact (1) and the carrier (3) is in a range of 60 to 70%.

In order to overcome such disadvantages and to save brazing material, flux etc., various brazing process have been proposed. In view of the joint area coefficient and the life of the contactor, such proposed brazing process results in inferior quality versus those of the joint process for the contactor by the above-mentioned brazing process. Therefore, these processes have not been practically employed. For example, it has been proposed to form the clad silver layer (2) on the surface of the contact (1) and then to weld the contact (1) and the carrier (3) by resistance-heating as shown in FIG. 2 (A), (B). That is, the contact (1) having the clad silver layer (2) and the carrier (3) made of a copper alloy are held by an upper electrode (7) and a lower electrode (8) and are welded by feeding current to heat them. In such process, the cald silver layer (2) and the carrier (3) are partially fused in the joint part (9) to form an alloy and the alloy is scattered out of the peripheral part of the contact (1) to form a burr (10). The burr (10) causes remarkable deterioration of the fusion resistance and the life. Moreover, a burn-stick or fusion is easily caused between the upper electrode (7) and the contact (1) or between the lower electrode (8) and the carrier (3) to cause inferior workability.

SUMMARY OF THE INVENTION

It is an object of the present invention to provide a liquid joint process for joining of an electrical contact and a carrier to impart excellent fusion resistance and long life.

The foregoing and other objects of the present invention have been attained by providing a liquid joint process which comprises the steps of feeding a liquid in clearance formed between an electrical contact for joint and a carrier and around a joint part for joining said electrical contact and said carrier; holding said electrical contact and said carrier by an upper electrode and a lower electrode from both sides under a predetermined pressure; and feeding current between said electrical contact and said carrier through said upper and lower electrode.

BRIEF DESCRIPTION OF THE DRAWINGS

FIG. 1 is a schematic view of an electrical contactor prepared by the conventional brazing process;

FIG. 2(A) is a schematic view for illustrating a resistance welding process of the conventional electrical contact joint process;

FIG. 2(B) is a schematic view of an electrical contact joined by the conventional resistance welding process;

FIG. 5 is a characteristic diagram of the characteristics of electrical contactors prepared by the liquid joint process of the present invention and the conventional process.

DETAILED DESCRIPTION OF THE PREFERRED EMBODIMENTS

Figure 3A:
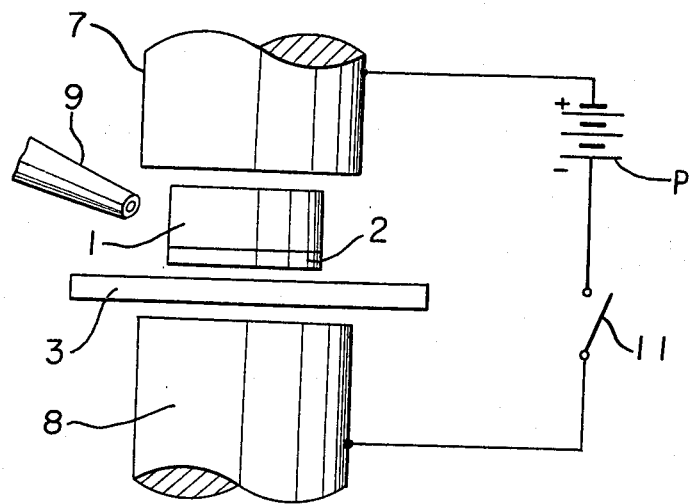
FIGS. 3(A), (B), (C) and (D) are respectively schematic views for illustrating one embodiment of the liquid joint process according to the present invention.

Referring to FIGS. 3(A), (B), (C) and (D), the liquid joint process of the present invention will be illustrated.

The liquid joint process of the present invention will be illustrated for a preparation of an electrical contact.

A silver layer (2) as a clad silver layer is formed on an electrical contact (1) and the contact is placed on a carrier (3). An upper electrode (7) and a lower electrode (8) are placed in the relation shown in FIG. 3(A). An opening of a nozzle (9) for feeding a liquid is advanced to the joint part between the silver layer (2) and the carrier (3). A power source (P) and a switch (11) are connected to the upper electrode (7) and the lower electrode (8). The switch (11) is turned off whereby any current is not fed between the electrodes (7), (8).

Figure 3B:
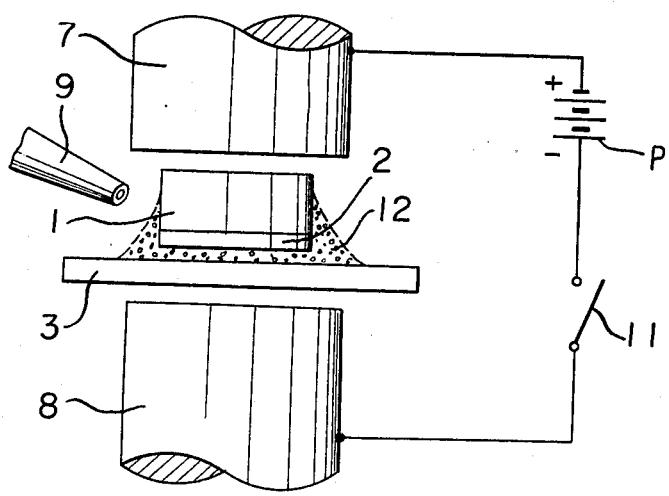
Figure 3C:
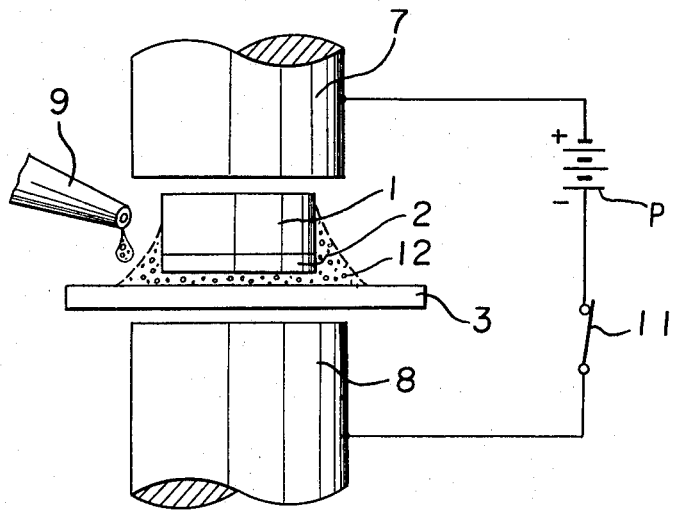

Water or alcohol as the liquid (12) is fed from the nozzle (9) in a clearance between the clad silver layer (2) of the contact (1) and the carrier (3) and around the contact part as shown in FIG. 3(B). The water or an alcohol as the liquid (12) forms arcuate shaped surface because of surface tension. Both electrodes (7), (8) are pressed so as to approach both electrodes (7), (8) under the condition holding the liquid on and around the contact part as shown in FIG. 3(B). At the same time, as shown in FIG. 3(C), the switch (11) is turned on to connect the power source (P) to both electrodes (7), (8) whereby the current is fed through the electrodes (7), (8) to the contact (1), the clad silver layer (2) and the carrier (3). In accordance with current feeding under the pressure, a melting point is reduced by a diffusion and an eutectic reaction of Ag component of the clad silver layer (2) and Cu component of the copper alloy of the carrier (3), whereby the clad silver layer and the carrier are partially melted in an alloy state to form the joint part.

Water or alcohol in the clearance between the silver layer (2) of the contact (1) and the carrier (3) is evaporated by heating in the electrical current feed or is pressed out by reducing the clearance under pressing whereby it does not contribute to the joint. The amount of water or an alcohol around the joint part exceeds the loss caused by the evaporation by the heating under the current feeding whereby the water or alcohol remains in the joint process. The amount of the liquid is preferably in a range of 0.1 to 2 cc. When it is more than 2 cc, the cooling effect causes deterioration of the joint whereas when it is less than 0.1 cc, it may be lost in the liquid joint process.

The function of water or alcohol around the joint part will be illustrated.

Figure 3D:
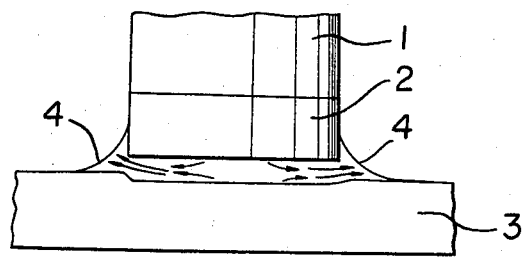
Figure 4:
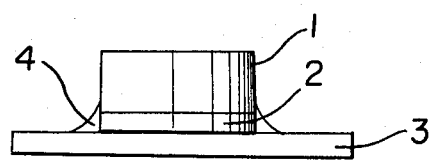
FIG. 4 is a schematic view of an electrical contactor prepared by the liquid joint process according to the present invention.

The molten alloy metal formed by melting is gradually squeezed from the clearance between the silver layer (2) and the carrier (3) to the outer space as shown by the arrow line in FIG. 3(D) under pressing the contact (1) and the carrier in contact. The squeezed molten metal is brought into contact with the water or alcohol to form a fillet having the shape shown in FIG. 4 without scattering to form burr. The water or alcohol shields the molten metal from the environmental air.

When a desired fillet (4) is formed to complete the joint between the silver layer (2) and the carrier (3), the switch (11) is turned off to stop the current feeding and the pressure between both electrodes (7), (8) is released to complete the joint. Thus, the electrical contactor shown in FIG. 4 can be obtained.

In the embodiment, the electrical contact (1) is made of Ag-CdO (13%) and has a diameter of 4.2 mm. The carrier (3) is made of beryllium-copper. The welding process is carried out under the welding condition of a welding current of 13,000 A; a welding time of 14 cycles; and a welding pressure of 140 kg.

Shear strengths at high temperature of the electrical contactors prepared by the liquid joint process using water and by the conventional processes are shown in FIG. 5.

In the above-mentioned embodiment, the electrical contact (1) is made of Ag-CdO and the carrier (3) is made of beryllium-copper. Thus, the material for the contact (1) can be other materials such as $Ag-SnO_2-In_2O_3$. The material for the carrier (3) can be other material such as chromium-copper, brass, tough pitch copper etc. to impart the same result.

As described, in accordance with the present invention, the welding of the electrical contact and the carrier is attained for a short time without using a brazing material or a flux which are required in the conventional process. Even though the clad silver layer is formed on the contact (1), the molten silver of the clad silver layer (2) which is melted and squeezed from the joint part (12) between the contact (1) and the carrier (3), forms the fillet part (13) by the liquid whereby the electrical contactor having long life and high reliability advantageously can be obtained.

We claim:

1. A liquid joint process for joining an electrical contact and a carrier having a clearance formed therebetween which comprises feeding a liquid in and around said clearance formed between said electrical contact and said carrier so as to form an arcuate shaped liquid surface which is in contact with both said electrical contact and said carrier;

holding said electrical contact and said carrier by an upper electrode and a lower electrode from both sides under a predetermined pressure; and feeding current between said electrical contact and said carrier through said upper and lower electrode wherein said feeding of liquid comprises feeding liquid in an amount of 0.1 to 2 cc on and near an electrical contact interface between said contact and said carrier.

2. The liquid joint process according to claim 1 wherein said step of feeding liquid further comprises feeding water.

3. The liquid joint process according to claim 1 or 2 wherein said carrier further comprises a copper alloy and wherein opposing surfaces of said carrier and said electrical contact each have a silver layer formed thereon.

4. The liquid joint process according to claim 1 wherein said step of feeding liquid further comprises feeding alcohol.

* * * * *